US007509841B2

(12) United States Patent
Spaolonzi et al.

(10) Patent No.: US 7,509,841 B2
(45) Date of Patent: Mar. 31, 2009

(54) FLEXIBLE LEAK DETECTION SYSTEM AND METHOD FOR DOUBLE CARCASS HOSE

(75) Inventors: Mauricio Pinto Spaolonzi, Sao Paulo (BR); Airton Domingos Moreno, Americana (BR); Marcelo Martins Werneck, Rio de Janeiro (BR); Cesar Cosenza De Carvalho, Rio de Janeiro (BR)

(73) Assignee: Veyance Technologies, Inc., Akron, OH (US)

( * ) Notice: Subject to any disclaimer, the term of this patent is extended or adjusted under 35 U.S.C. 154(b) by 117 days.

(21) Appl. No.: 11/486,583

(22) Filed: Jul. 14, 2006

(65) Prior Publication Data

US 2008/0011056 A1     Jan. 17, 2008

(51) Int. Cl.
*G01M 3/18* (2006.01)
*G01M 3/28* (2006.01)
*G01M 3/38* (2006.01)
*G08B 21/20* (2006.01)
*F16L 11/16* (2006.01)

(52) U.S. Cl. .......................... 73/49.1; 73/40.5 R; 73/46; 73/49.2; 73/49.8; 138/104; 340/605

(58) Field of Classification Search ................ 74/40; 73/1.02, 40.5 R, 61.56, 137, 40, 46–49.3; 138/104, 137; 340/605
See application file for complete search history.

(56) References Cited

U.S. PATENT DOCUMENTS

| 2,250,496 | A | 7/1941 | Postlethwaite | |
| 2,759,175 | A | 8/1956 | Spalding | 340/242 |
| 3,299,417 | A | 1/1967 | Sibthorpe | 340/242 |
| 3,800,217 | A | 3/1974 | Lowrance | 324/54 |
| 3,834,235 | A | 9/1974 | Bouton et al. | 73/293 |
| 3,972,223 | A | 8/1976 | Torghele | |
| 4,153,079 | A | 5/1979 | Ambrose | 138/104 |
| 4,259,553 | A | 3/1981 | Tanaka et al. | 200/81 R |
| 4,270,049 | A | 5/1981 | Tanaka et al. | 250/227 |

(Continued)

FOREIGN PATENT DOCUMENTS

DE     29608551 U1 *   7/1996

(Continued)

OTHER PUBLICATIONS

U.S. Appl. No. 11/299,883, filed Dec. 12, 2005, DN2005158.

(Continued)

*Primary Examiner*—David A. Rogers
(74) *Attorney, Agent, or Firm*—Wood, Herron & Evans, LLP

(57) ABSTRACT

A fluid leak detection system mounts to a hose line segment of the type comprising at least an inner carcass and an outer containment carcass separated from the inner carcass by a collection space. The system includes a housing defined by sidewalls externally mountable to the hose line segment and having an internal housing chamber in fluid communication with the collection space. A system sensor casing mounts through a sensor housing sidewall and a plurality of alternatively configured sensor units are provided, each interchangeably coupling with the sensor casing. The sensor units detect the presence of fluid within the sensor housing and communicate the fluid status of the chamber for remote evaluation.

25 Claims, 8 Drawing Sheets

U.S. PATENT DOCUMENTS

| | | | |
|---|---|---|---|
| 4,286,464 A | 9/1981 | Tauber et al. | 73/293 |
| 4,386,269 A | 5/1983 | Murphy | 250/227 |
| 4,446,892 A | 5/1984 | Maxwell | 138/104 |
| 4,465,105 A | 8/1984 | Slater | 138/104 |
| 4,509,558 A | 4/1985 | Slater | 138/104 |
| 4,630,490 A | 12/1986 | Malicki | |
| 4,638,132 A | 1/1987 | Miller | |
| 4,689,484 A | 8/1987 | McMahon | |
| 4,749,855 A | 6/1988 | Watanabe | 250/227 |
| 4,764,671 A | 8/1988 | Park | 250/227 |
| 4,775,855 A | 10/1988 | Cox | 340/605 |
| 4,834,497 A * | 5/1989 | Angel | 385/12 |
| 4,851,817 A | 7/1989 | Brossia et al. | |
| 4,922,232 A | 5/1990 | Bosich | 340/605 |
| 4,932,257 A | 6/1990 | Webb | 73/40.5 |
| 4,961,069 A | 10/1990 | Tsaprazis | 340/619 |
| 5,005,005 A | 4/1991 | Brossia et al. | 340/604 |
| 5,022,045 A | 6/1991 | Elliott | 374/20 |
| 5,058,420 A | 10/1991 | Vali et al. | 73/49.2 |
| 5,090,871 A | 2/1992 | Story et al. | 417/9 |
| 5,102,012 A | 4/1992 | Foster | 222/40 |
| 5,142,914 A | 9/1992 | Kusakabe et al. | |
| 5,176,025 A | 1/1993 | Butts | 73/40 |
| 5,187,366 A | 2/1993 | Hopenfeld | 250/302 |
| 5,200,615 A | 4/1993 | Hopenfeld | 250/302 |
| 5,244,016 A | 9/1993 | Kuroda et al. | 138/103 |
| 5,265,465 A | 11/1993 | Thomas | 73/49.02 |
| 5,267,670 A | 12/1993 | Foster | 222/1 |
| 5,279,157 A | 1/1994 | Mattis et al. | 73/290 R |
| 5,279,332 A | 1/1994 | Winter et al. | 138/111 |
| 5,291,032 A | 3/1994 | Vali et al. | 250/577 |
| 5,305,798 A | 4/1994 | Driver | 138/98 |
| 5,323,142 A | 6/1994 | Fain | |
| 5,343,736 A | 9/1994 | Cady et al. | 73/40 |
| 5,394,904 A | 3/1995 | Winter et al. | 138/137 |
| 5,399,876 A | 3/1995 | LaClair | 250/577 |
| 5,413,146 A | 5/1995 | Kuroda et al. | 138/104 |
| 5,427,155 A | 6/1995 | Williams | 138/103 |
| 5,452,076 A | 9/1995 | Schopper et al. | 356/128 |
| 5,551,484 A | 9/1996 | Charboneau | 138/104 |
| 5,553,971 A | 9/1996 | Osborne | 405/52 |
| 5,590,981 A | 1/1997 | Osborne | 405/154 |
| 5,650,564 A | 7/1997 | Wodeslavsky et al. | |
| 5,654,499 A | 8/1997 | Manuli | |
| 5,714,681 A | 2/1998 | Furness et al. | 73/40.5 |
| 5,775,842 A | 7/1998 | Osborne | 405/154 |
| 5,828,798 A | 10/1998 | Hopenfeld | |
| 5,905,194 A | 5/1999 | Strong | 73/40.5 R |
| 6,026,862 A | 2/2000 | Friedrich et al. | 138/112 |
| 6,032,699 A | 3/2000 | Cochran et al. | 138/104 |
| 6,070,617 A | 6/2000 | Honda et al. | 138/104 |
| 6,082,392 A | 7/2000 | Watkins, Jr. | 137/312 |
| 6,112,580 A | 9/2000 | Hesky | 73/49.1 |
| 6,116,817 A | 9/2000 | Osborne | 405/154 |
| 6,129,107 A | 10/2000 | Jackson | 137/312 |
| 6,149,032 A * | 11/2000 | Seitz | 222/25 |
| 6,161,591 A | 12/2000 | Winter et al. | 138/121 |
| 6,305,427 B1 | 10/2001 | Priest, II | 138/125 |
| 6,328,074 B1 | 12/2001 | Wright et al. | 138/137 |
| 6,330,890 B1 * | 12/2001 | Ekman | 137/269 |
| 6,374,863 B1 | 4/2002 | Friederich | 138/104 |
| 6,386,237 B1 | 5/2002 | Chevalier et al. | 138/104 |
| 6,498,991 B1 | 12/2002 | Phelan et al. | 702/34 |
| 6,550,499 B1 | 4/2003 | Pai | 138/104 |
| 6,688,338 B2 | 2/2004 | Meli et al. | 138/123 |
| 7,213,611 B2 | 5/2007 | Flynn | |
| 2002/0074042 A1 | 6/2002 | Olivas et al. | |
| 2003/0234730 A1 * | 12/2003 | Arms et al. | 340/870.01 |
| 2004/0154380 A1 | 8/2004 | Walker | 73/40.5 |
| 2004/0177891 A1 * | 9/2004 | Spaolonzi et al. | 138/104 |
| 2005/0076955 A1 | 4/2005 | Boehland et al. | |
| 2006/0122747 A1 | 6/2006 | Brown, Jr. | 701/29 |

FOREIGN PATENT DOCUMENTS

| | | |
|---|---|---|
| DE | 19848015 A1 | 4/2000 |
| EP | 291041 A * | 11/1988 |
| EP | 0 535 997 A1 | 4/1993 |
| EP | 0 695 902 | 2/1996 |
| EP | 1460408 A1 | 9/2004 |
| GB | 2 027 838 | 2/1980 |
| GB | 2138917 A | 10/1984 |
| JP | 8-261861 | 10/1996 |
| JP | 8261861 | 10/1996 |
| JP | 10-61900 | 3/1998 |
| JP | 11325378 | 11/1999 |
| JP | 2004-239612 | 8/2004 |
| JP | 2004239612 | 8/2004 |
| WO | WO 90/00698 | 1/1990 |

OTHER PUBLICATIONS

European Patent Office, International Search Report issued in corresponding EP Application serial No. 07013805 dated Apr. 8, 2008.

* cited by examiner

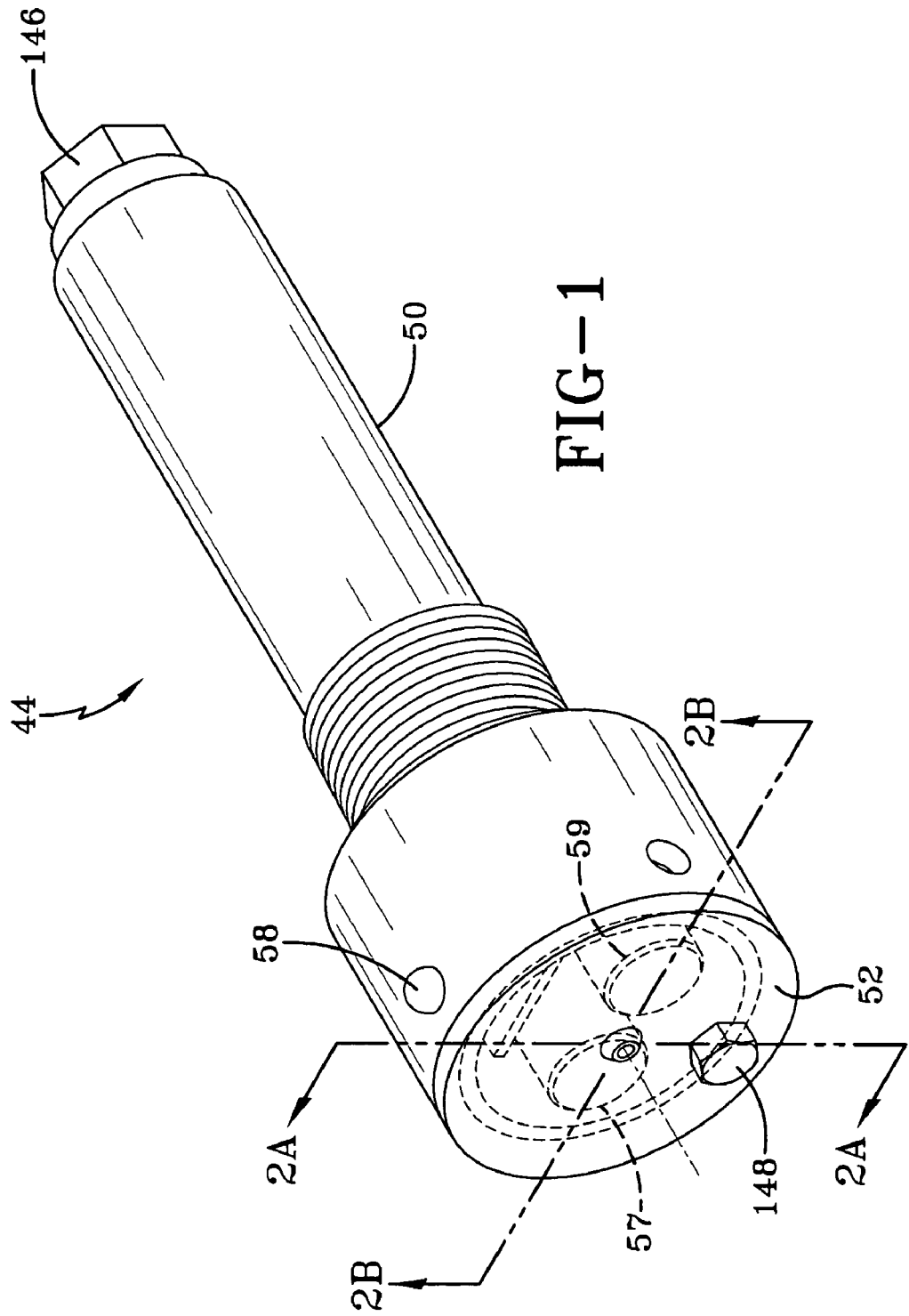

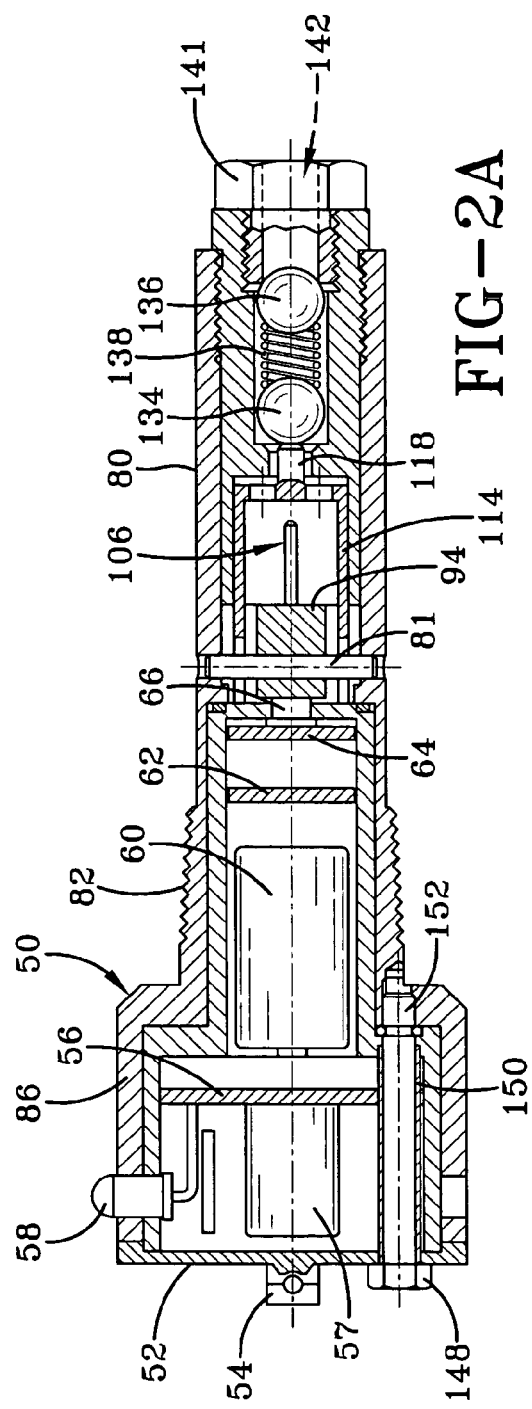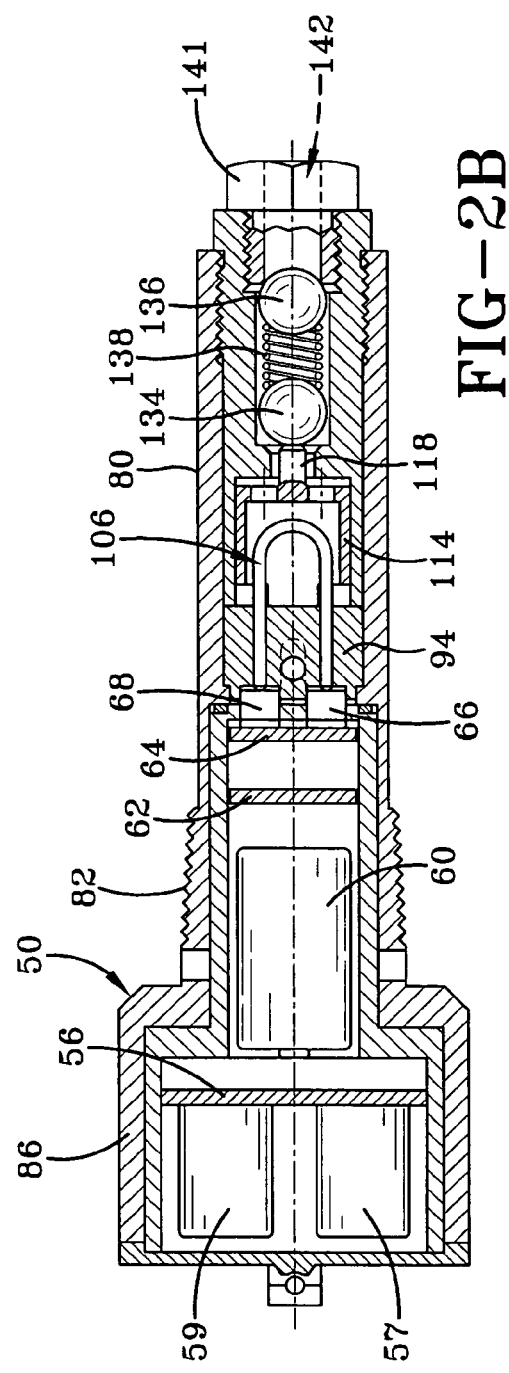

FLEXIBLE LEAK DETECTION SYSTEM AND METHOD FOR DOUBLE CARCASS HOSE

FIELD OF THE INVENTION

The invention relates generally to offshore oil load and discharge terminals and, more specifically, to hose leak detection systems deployed within the context of such oil load and discharge terminals.

BACKGROUND OF THE INVENTION

In offshore oil load and discharge operations, there is a systematic risk of oil leakage to the sea from damage to single carcass submarine or floating oil suction and discharge hoses. As used herein, a "single carcass hose" is a hose construction comprising only one carcass layer. Leakage from a single carcass hose may occur from a precipitous hose failure or a failure that materializes over time. Hose failure may result from overpressure of the system, a puncture from outside, sudden tensile break of the hose body, defects in the manufacture, construction or design of the hose, etc. In a single carcass hose construction, hose failure results in immediate oil leakage to the environment surrounding the hose. Such leakage is highly undesirable for obvious environmental and economic reasons.

Because of the risk of failure inherent in single carcass hose construction, a "double carcass" hose construction has been proposed and developed by those in the industry. A double carcass hose construction utilizes an outer hose carcass confining an inner hose carcass as an added safeguard. The outer hose functions to hold any oil or fluid that leaks through the inner hose carcass for a certain designed period of time. In a typical double carcass construction, a hose includes a main pressure cord or carcass layer as a primary confinement and an outer, or auxiliary, pressure cord layer formed so as to sheathe the inner carcass. A buffering space is defined between the carcass layers to retain fluid that leaks from the inner carcass. In use, it is common to connect hoses end-to-end to form a hose line for transporting oil or other fluid under pressure. U.S. Pat. No. 5,244,016 discloses a hose representative of the state of the art double carcass construction.

A double carcass hose is generally produced and utilized in two different types: submarine or floating configurations, depending on the type of application and offshore oil load and discharge system. Submarine applications require that a hose extend in submerged fashion between two points whereas a floating application requires that the hose extend across the water surface. In either application, leakage from the hose results in the aforementioned undesirable consequences.

In order to minimize the damage resulting from an undetected leak, various leak detection systems have been proposed and adopted. Such systems generally employ leak detectors of various configurations, operable under varying principles, mounted at the nipple region of an underwater hose connection. U.S. Pat. No. 5,654,499 teaches a detector mounted to an end of a hose for detecting fluid upon contact between a sensing medium and the fluid. U.S. Pat. No. 4,465,105 teaches a pressure sensitive switch for detecting by means of measuring the pressure of leakage fluid between carcass layers. U.S. Pat. No. 5,714,681 discloses an electro-optical sensor that utilizes an infrared beam that senses fluid levels when the beam is deflected.

In general, in offshore oil transfer hose lines using double carcass hoses, there is a constant physical check of hose and leak detectors required because most leak detectors are mechanical devices. The existence of an oil leak must be manually or visually confirmed by checking each leak detector. Consequently, a constant monitoring of each hose line is required. Such monitoring activities may be done by the oil company itself or a contract service provider. The monitoring entity keeps records and files detailing monitoring activity and typically hand-writes such records "in-situ". However, local conditions may make it difficult for the monitoring entity to annotate data observed. Operational conditions may further be such (e.g. high seas) that there is substantial danger to operational personnel and also a risk that incorrect data will be observed and collected by the monitoring agent.

Existing leak monitoring systems and devices, therefore, while working well under benign conditions, may fail to provide accurate monitored data under certain other conditions. The leak detection devices themselves may be electrically unsafe in that they have active or power components within the oil collection space, creating a fire or explosion risk. Secondly, the communication systems in existing systems provide, at times, unreliable communication between the sensing elements and remote receivers or visual observers. The positioning of the sensors may also be affected by the floating hose line torsion when deploying the hose line into the water. The sensors may also be positioned incorrectly during hose line segment assembly. Finally hose lines move as a result of seawater and weather conditions and such movement can cause sensor position change/failure, or cause erroneous data collection by the monitoring agent.

Additional deficiencies in existing art sensing systems are that they are relatively large, expensive to manufacture, cumbersome to deploy, and provide a less than satisfactory degree of reliability and flexibility. Available systems typically provide one means of communicating the leak status of a hose segment or coupling. Such systems may use a mechanical sensor that communicates visually, such as by means of a flashing LED to an on-site observer. Other systems may detect a leak and communicate by signal transmission to a remote receiver. In some applications the first, inspection based system may be preferable while in other applications a transmitter based communication may be preferable. No system affords a user the flexibility of alternatively deploying different communication devices at the preference or election of the user.

Accordingly, the industry is in need of a flexible leak detector and system that is reliable, safe, efficient, miniaturized, and cost effective to manufacture, deploy, and maintain. A desired system will accurately provide leak detection data despite rough operational conditions and minimize data collection and transmission failures. Ideally, the system will be capable of communicating the leak status within a hose reliably throughout a wide range of operational conditions.

SUMMARY OF THE INVENTION

The subject invention according to one aspect provides a flexible system for detecting leaks within a double carcass hose and communicating leak detection data/status by alternative means. Alternative leak detection devices may be deployed in the system. Pursuant to one aspect of the invention, a mechanical leak detector unit with a passive ID chip; or a leak detector incorporating an LED and a passive ID chip; or a telemetry leak detector unit may be employed depending on a user's preference and application conditions. The alternative leak detector units may, pursuant to another aspect of the invention, be interchangeably deployed within a universal casing. A user may accordingly readily replace a defective leak detector unit or replace one type of leak detector with another type of leak detector unit in situ as required or desired.

Pursuant to another aspect of the invention, a fluid leak detection system includes a hose line segment of the hose type comprising at least an inner carcass and an outer containment carcass separated from the inner carcass by a collection space; a housing defined by sidewalls externally mountable to the hose line segment and having an internal housing chamber in fluid communication with the collection space; a sensor casing mounted through a sensor housing sidewall; and a plurality of alternatively configured sensor units, each interchangeably coupling with the sensor casing. Each sensor unit detects the presence of fluid within the sensor housing and communicates the fluid status of the chamber.

According to another aspect of the invention, identification and leak status data is stored within the sensor unit and a mobile reader unit is employed to collect the data and download the data into a computer memory for subsequent transmission to remote terminals or to provide website data access.

Pursuant to another aspect of the invention, a method for detecting leaks in a double carcass hose includes affixing a fluid collection housing to the hose, the housing having sidewalls defining an internal housing chamber in fluid communication with the collection space; mounting a sensor casing through a sensor housing sidewall; selecting one from a plurality of alternatively configured sensor units, the plurality of sensor units each interchangeably coupling with the sensor casing; and coupling the selected one sensor unit to the sensor casing, the one sensor unit detecting the presence of fluid within the sensor housing chamber.

DESCRIPTION OF THE DRAWINGS

The invention will be described by way of example and with reference to the accompanying drawings in which:

FIG. 1 is an assembled perspective view of a leak detector constructed pursuant to the invention;

FIG. 2A is a longitudinal sectional view through the leak detector of FIG. 1 taken along the line 2A-2A;

FIG. 2B is a longitudinal sectional view through the leak detector of FIG. 1 taken along the line 2B-2B;

DETAILED DESCRIPTION OF THE INVENTION

Figure 7:
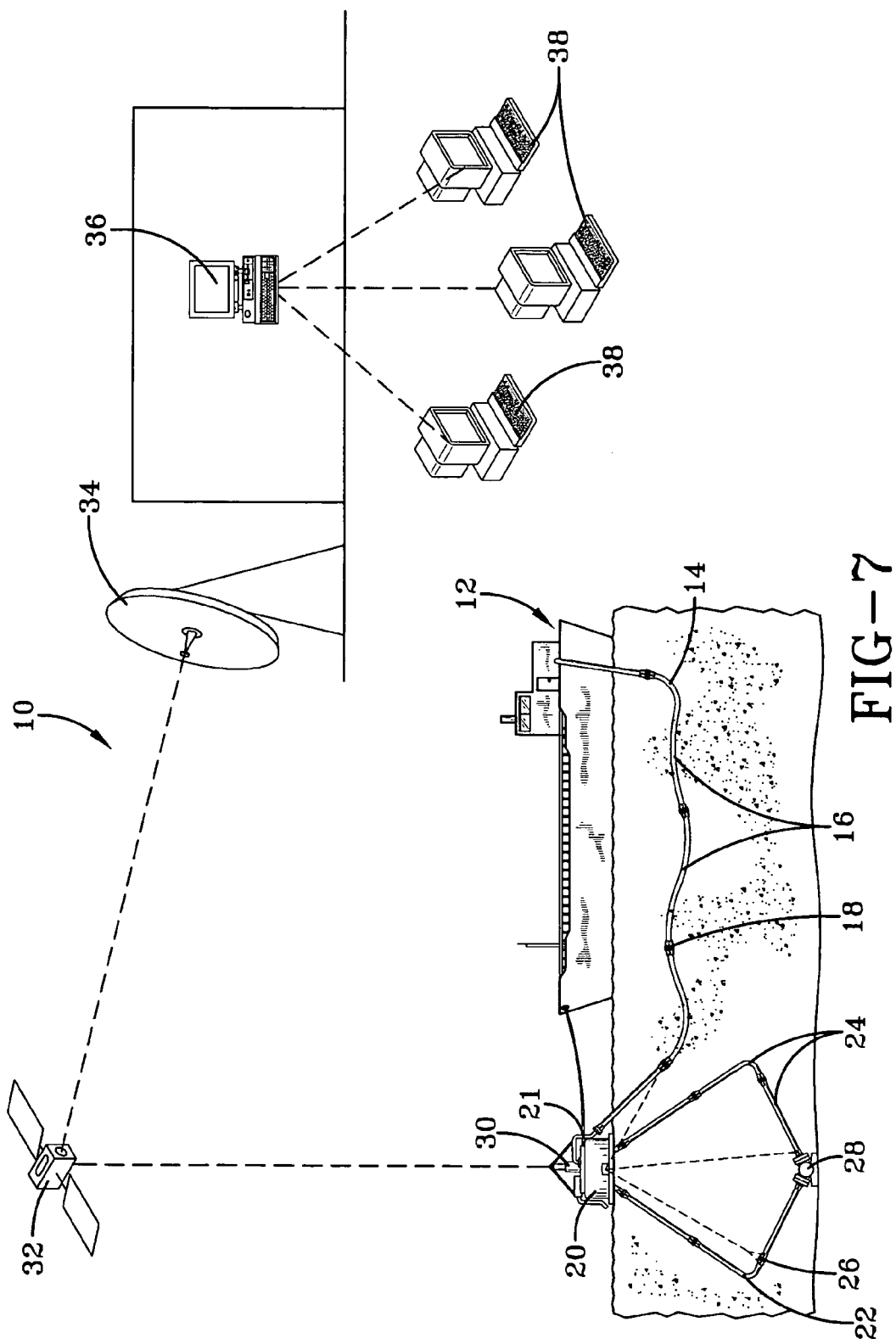
FIG. 7 is a representation of one leak detection system diagram configured pursuant to the invention.

Referring initially to FIG. 7, an offshore oil loading and discharge terminal is depicted by way of example incorporating a double carcass hose with built-in electronic remote oil leak detection system 10 configured pursuant to the subject invention. The offshore oil loading and discharge terminal of FIG. 7 is but one of many applications for the invention and the invention is not intended to be limited thereto. Any application in which a double carcass hose is utilized for the transportation of a fluid can utilize the subject leak detection system and the teachings herein set forth.

FIG. 7 schematically represents a tanker or platform 12. Extending from the tanker 12 is a network of submerged hose lines 14 comprising end to end connected hose segments 16 joined together by a coupling 18. Hose lines 14, while illustrated as submersible, may also be configured as floating lines if desired for an intended application. The submerged lines 14 extend to a buoy 20 and connect thereto by a coupling 21. Submarine hose lines 22 depend from buoy 20 and comprise hose segments 24 connected end to end by couplings 26. Submarine hose lines 22 terminate at a pump station 28. Oil is pumped from station 28 upward through hose lines 22 to the lines 14 and therein to the tanker 12. Pursuant to the invention, as explained in detail below, leak detection sensors are disposed within the hose lines 14 and 22 to detect fluid leakage and prevent the fluid from escaping into the sea. Preferably, although not necessarily, each hose segment is provided with two sensors, one at each end. More or fewer sensors per hose line or hose line segment may be deployed if desired.

A transmitter 30 may be mounted to the buoy 20 and communicate with the sensors in each hose segment 24. Data indicating the leak status of each hose segment is communicated to the transmitter and transmitted via satellite 32 to a central data processor/receiver 36 connected to antenna 34. The receiver 34 distributes the data to one or more decentralized remote terminal locations 38 so that the status of the hose lines 14, 22 may be monitored. Alternatively, or in conjunction with the data distribution to terminals 38, data relating to leaks may be downloaded into a main computer storage and website access provided thereto as will be explained.

Figure 3A:
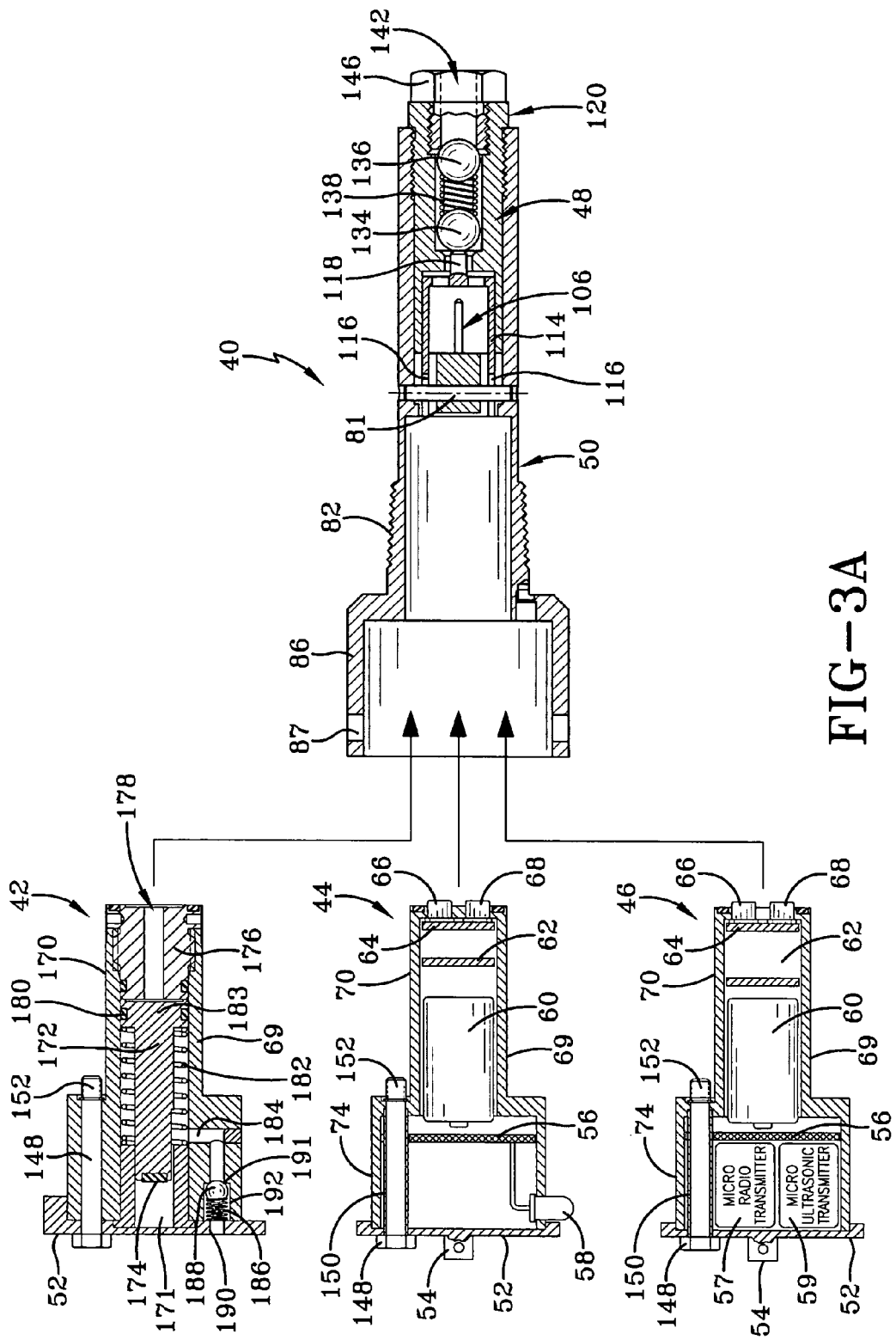
FIG. 3A is a longitudinal exploded sectional view of the casing assembly and representative three sensor assemblies compatible therewith pursuant to the invention.

With reference to FIGS. 1 and 3A, leak detectors suitable for use in the subject system are illustrated. The system may utilize alternatively configured leak detectors 42, 44, 46 in conjunction with a common casing assembly 40. Mechanical leak detector assembly 42; optical leak detector assembly 44; and telemetry leak detector assembly 46 interchangeably couple with the casing assembly 40 to provide a flexible system that, depending on a customer's choice, different ways of monitoring oil leak through the first carcass of a double carcass hose may be achieved. While three optional configurations for detecting leaks, assemblies 42, 44, 46, other types of leak detection devices may be employed (not shown) with the casing assembly 40 in addition thereto without departing from the invention.

A forward pressure valve assembly 48 is disposed within a tubular rigid casing 50 of the casing assembly 40. The valve assembly 48 denies leaking fluid from the hose segment from accessing the leak detection assembly coupled to the casing 50 unless a prescribed pressure threshold is exceeded. The valve assembly 48 also prevents external water from migrating through the casing 50 and into the hose from the opposite direction. The casing 50 readily interchangeably couples with each variety of leak detection assembly 42, 44, 46 to meet the needs of the user as well as to facilitate replacement of malfunctioning detector components should the need arise.

Figure 3B:
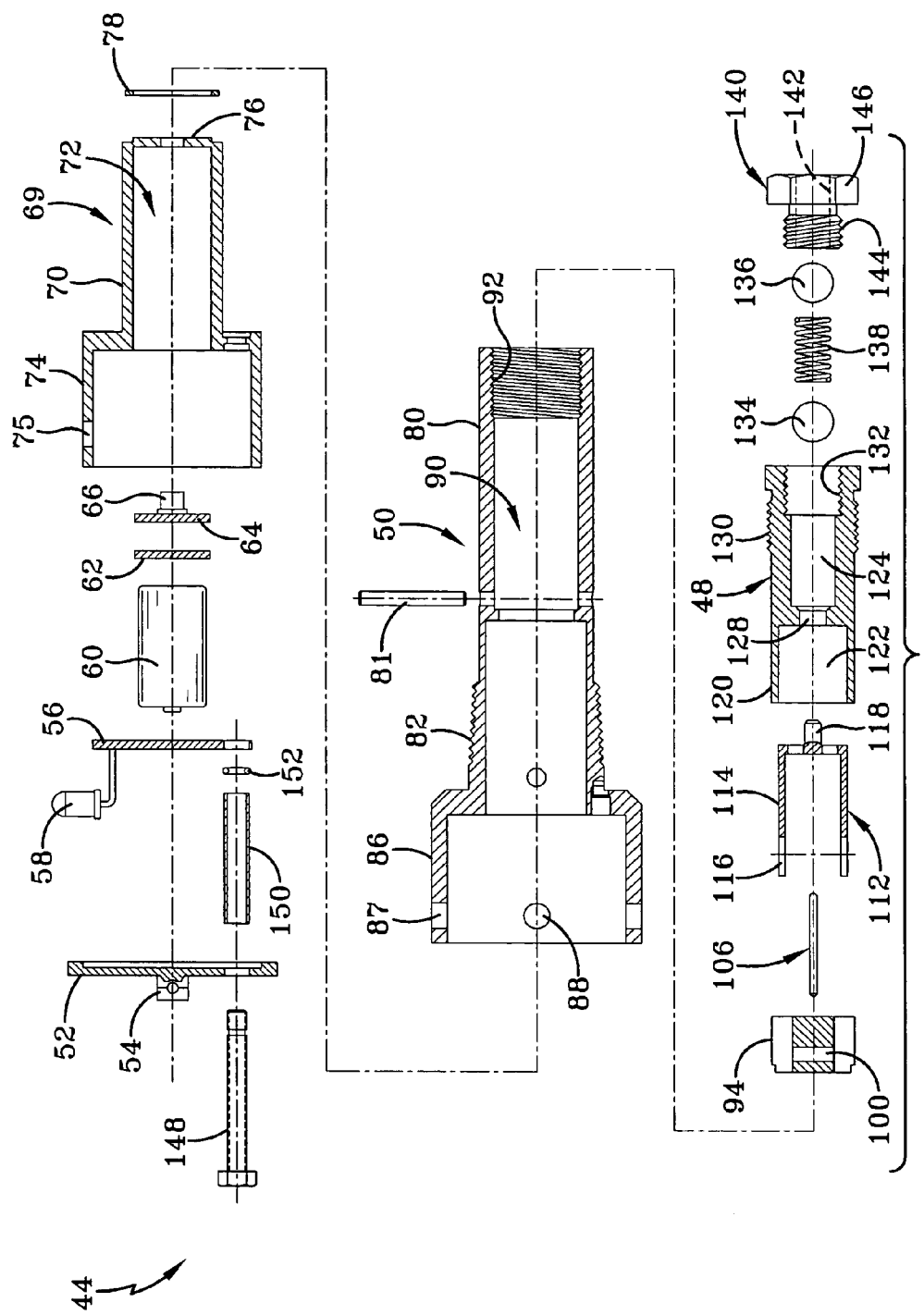
FIG. 3B is an exploded sectional view of the LED sensor assembly.
Figure 3C:
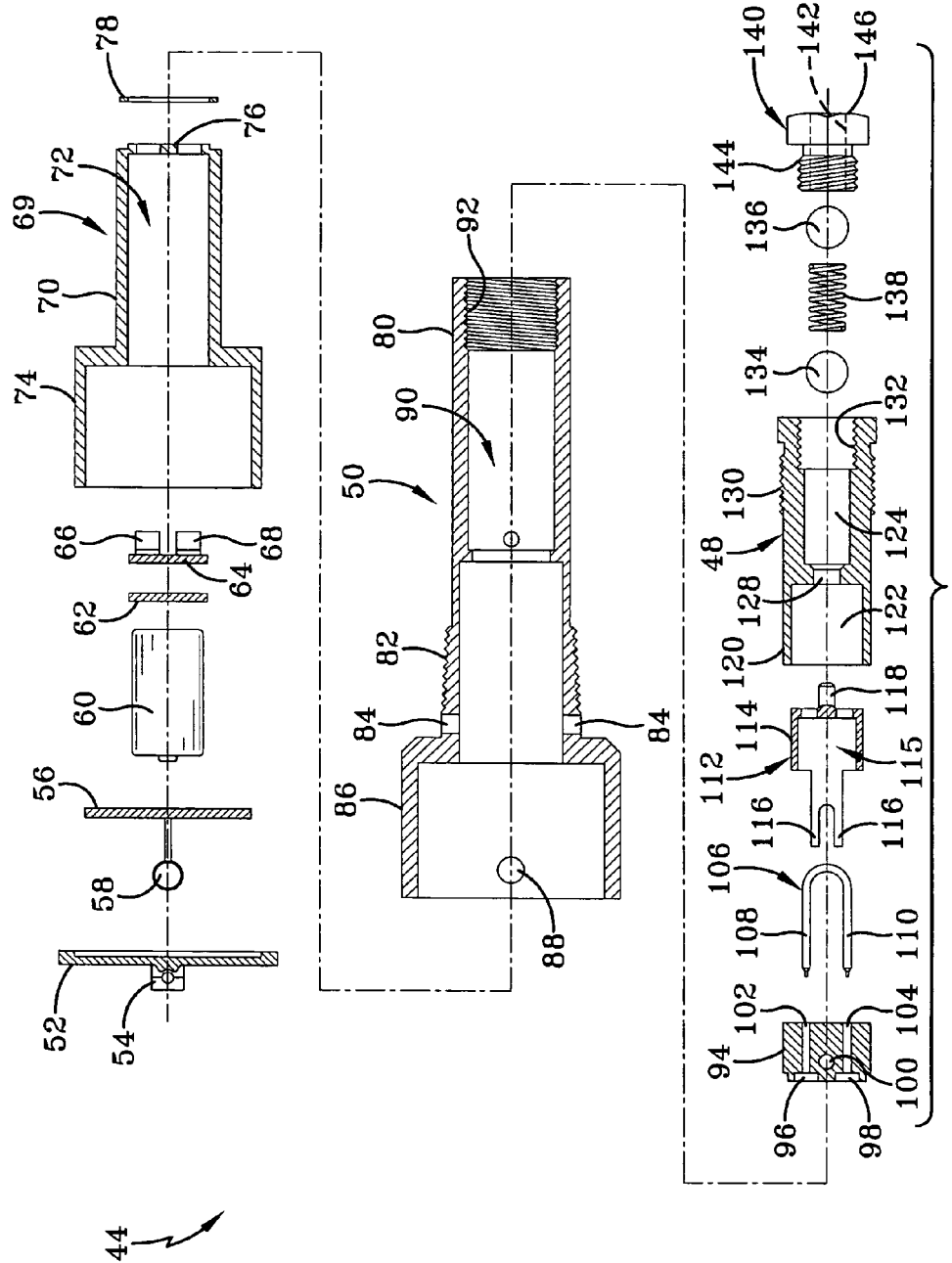
FIG. 3C is an exploded perspective view of the LED sensor assembly rotated ninety degrees from the position depicted in FIG. 3B.

With reference to FIGS. 1, 2A, 2B, 3A, 3B, and 3C, the component assembly of the leak detector assemblies 42, 44, 46 will be explained. FIGS. 3B and 3C illustrate in exploded view the optical version leak detection assembly 44. The assembly forms a generally cylindrical device combining the leak detection assembly 44 and the casing assembly 40. An end plate 52 has an LED housing 54 projecting rearwardly therefrom. An LED circuit board 56 of a type available to the industry drives an LED 58 that fits within the housing 54. A long cycle battery 60 is disposed forward of the board 56 and rearward of transmitter circuit board 64. An O-ring seal 62 is disposed between the battery 60 and the board 64.

Extending forward from the board 64 are a pair of optical fiber connectors 66, 68. The circuit board 64 is of a type commonly available and includes a micro-radio frequency transmitter and a micro-ultrasonic transmitter (in the telemetry version of the sensor assembly as shown in FIGS. 2A and 2B) as well as optical signal generating circuitry (in the optical version of the sensor assembly). The detection system is encapsulated into a casing 69, preferably although not necessarily formed of thermoplastic material. The casing 69 is generally cylindrical having a smaller diameter forward nose portion 70 and a larger diameter rearward head portion 74. A center axial passageway 72 projects through the casing 69 from end to end, beginning at an access orifice 76 at a forward end. An O-ring seal 78 is disposed forward and surrounds a forward end of the detector housing 69.

The detector assembly 44, as well as the other two detector assembly versions 42, 46, are interchangeable, each being configured for insertion into the casing 50. Casing 50 is formed of a rigid material, preferably steel. The casing 50 is generally tubular and elongate, and includes a forward smaller diameter forward nose portion 80, an intermediate external screw threaded portion 82, a transverse assembly bore 84 adjacent the threaded portion 82, and a rearward enlarged head portion 86. The head portion 86 is formed to provide LED portals 88 sized to admit and retain an LED 58 as best seen in FIG. 3A. The casing 50 has an axial passageway 90 therethrough from end to end and an internally threaded forward end 92.

A cylindrical optics support 94 formed of preferably thermoplastic material is provided having a pair of rearwardly directed optics connector sockets 96, 98 and a transverse assembly bore extending therethrough. A pair of optics receiving passageways 102, 104 extend from a forward end of the support 94, through the support to respective sockets 96, 98. The passageways 102, 104 are sized to receive respective legs 108, 110 of optic fiber loop 106. The legs 108, 110 project through the support 94 to the sockets 96, 98. So located, the loop 106 projects forward from the support 94.

An actuator member 112 is formed as cylindrical body 114 having central body cavity 115. A pair of tines 116 project rearward from the periphery of the body 114. A pin projection 118 is axially disposed on the central axis of body 114 and projects rearward.

The pressure valve assembly 48 includes a generally tubular elongate body 120 formed of suitable material such as thermoplastic. The body 120 has a rearward enlarged cavity 122 dimensioned to receive the actuator body 114 therein. A forward elongate valve cavity 124 extends to an anterior chamber 126 at the forward end of the body 120. The valve cavity 124 communicates with the enlarged cavity 122 by means of relatively narrow passageway 128. External threaded portion 130 is located about the medial portion of body 120 and internal threaded surface 132 surrounds the anterior cavity 126. The cavity 124 is sized to seat first and second valve balls 134, 136 and a spring member 138 situated between the balls. An end retention screw 140 is provided and screws into the forward end of the body 120. The retention screw 140 has a small bore axial passageway 142 that extends into screw head 146, along the body of the screw to the cavity 124. The ball 136 seats against the internal opening of the passageway 142 and the ball 134 seats against the internal opening of the passageway 128. Spring 138 in compression nominally biases the balls 134, 136 against their respective openings with a preset level of force as will be explained below. An assembly pin 148 is further provided with a spacer sleeve 150 and a pin retainer 152.

Assembly of the optical version 44 of the leak detection assembly will be readily appreciated from FIGS. 3B, 3C. The telemetry version of the leak detection assembly is shown in FIGS. 2A, 2B and incorporates signal transmission circuits that the optical version 44 does not require. The casing 69 receives the circuit board 64 therein until optical fiber sockets 66 protrude from opening 76. O-ring 78 mounts and seats over the forward end of the casing 69. Battery 60 inserts within the nose portion 70 of the body 69 followed by the LED electronics board 56. One or more signaling LEDs project out of board 56 and are aligned to reside within opening 75 of the casing 69. The end plate 52 encloses the rearward end of the body 69 and is secured by means of pin 148 extending through sleeve 150 to the retention cap 152. The assembly 44 is upon completion of assembly in condition for detachable coupling to the casing assembly 50.

Casing assembly 40 is assembled by positioning the optical support body 94 within passageway 90, and securing the body 94 into position by the extension of pin 81 through the body transverse passage 100. The optical loop ends extend through passages 102, 104 respectively of the support body 94 to the sockets 96, 98. The actuation member 112 is inserted within the passage 90 and tines 114, 116 of the member 112 are positioned within the passageway 90 to abut body 94. The body 112 is received within chamber 122 of the pressure valve body 120 and pin projection 118 extends through passageway 128 to abut ball 134.

The assembled optical detector assembly 44 couples to the casing assembly 40 by screw threaded attachment. As forward end of the casing nose portion 70 reaches a terminal location within the casing 80, optical connectors 66, 68 align with and enter into sockets 96, 98 respectively of the optics support body 94. So situated, an optical signal may be generated by electronic circuitry of board 64 and transmitted through the optical fiber loop 106. The forward end of the casing nose portion 70, upon reaching the terminal location within casing 80, will contact the support body 94 and push the body 94 forward. Such forward movement will cause pin projection 118 to move forward and move valve ball 134 forward. Ball 134 will thus be unseated, opening the passageway 128 between chambers 122, 124. Valve ball 136 remains seated against the passageway 142 through screw 140.

If an oil leak occurs through a hose carcass, oil will move between the two carcasses until it reaches the assembly spring 140 and the pressure valve assembly 48. The pressure valve, by appropriate selection of screw 138, may be set to open at a low pressure, for example 90 psi. If the oil pressure exceeds the threshold, oil pressure will force ball 136 away from the internal opening of passageway 142 into an open position. Oil may then travel inside the cavity 124 through passageway 128 and cavity 122 to the internal chamber 115 of the body 112 wherein the optical loop 106 resides. Upon reaching the optical loop 106, the oil modifies the optical transmission properties of fiber. The electronic analysis of the optical transmission through the loop 106 determines an oil leak has occurred and the sensor starts the LED(s) 58. The occurrence and detection of a leak may further be stored as data within a passive RFID chip located on the board 56. Passive RFID chips, that is requiring no energy source to function, are commonly available electronic devices. At the appropriate time, data stored inside the RFID chip may be retrieved as explained below.

It will be appreciated that the sensor assembly 44 may be disconnected from the casing assembly 40 by threaded detachment. Upon disassociation of the sensor assembly 44 from the casing assembly 40, the spring 138 will release from compression to force ball 134 into sealing engagement with passageway 128. If the sensor assembly is in an underwater environment, water from outside of the sensor will thus be prevented from entering passageway 124 and proceeding therefrom out the forward end of passageway 142. The pressure valve assembly 48 accordingly operates to open to allow leaking oil to access the optical fiber 106 when a leak occur and to close whenever the leak detection assembly (42, 44, 46) is uncoupled from the casing assembly 40.

Figure 5:
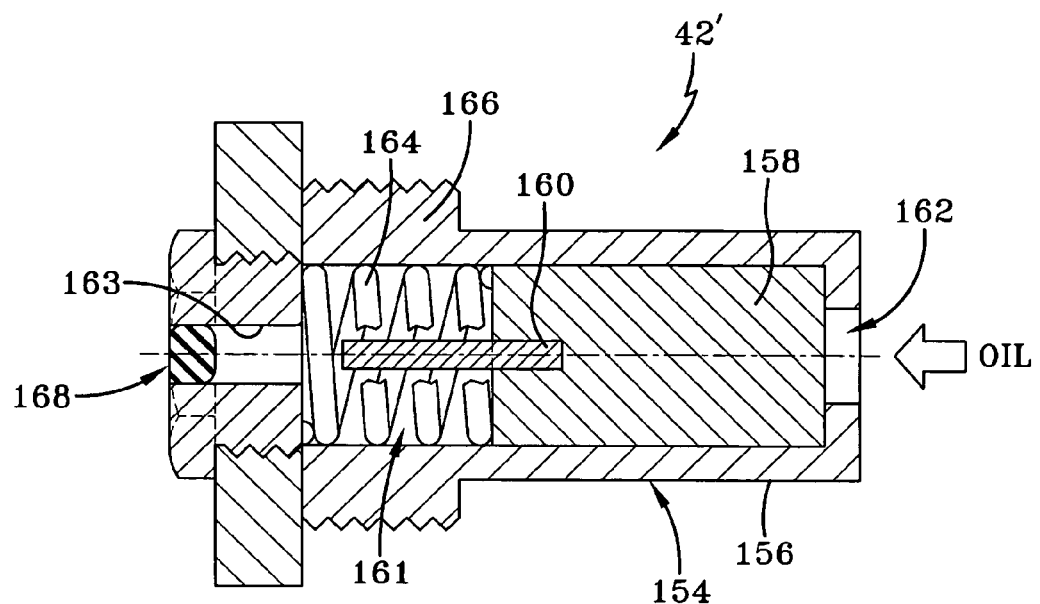
FIG. 5 is a longitudinal sectional view through a mechanical sensor assembly configured pursuant to the invention.

FIG. 3A and FIG. 5 show alternative mechanical versions of a leak detection assembly. The mechanical sensor assembly 154 of FIG. 5 includes a cylindrical body 156 having a sliding piston member 158 within an axial passageway 161. The piston 158 moves within the passageway between forward and rearward positions. Secured to the piston is a magneto 160 that moves with the piston between the forward and rearward positions. A forward opening 162 extends through the forward end of body 156 and communicates with axial passage 161. A coil spring 164 surrounds the piston 158 within the body 156 and biases the sliding piston to the forward side of the passageway 161. The body 156 has external screw threads for coupling with the casing assembly 40 and a rubber end cap 168 that includes an axial air venting passageway that extends to chamber 161. If an oil leak occurs through the first carcass of a hose, the oil will move between the two-carcasses until it reaches the forward end of the assembly 154. The oil forces the sliding piston 158 rearward and the magneto 160 moves rearward with the piston. The location of the magneto 160 may be externally determined by a reader and from the location of the magneto 160 a determination may be made that a leak has occurred. As described above with reference to the optical leak detection assembly 44, the occurrence and detection of a leak may further be stored as data within a passive RFID chip (not shown). Passive RFID chips, that is, requiring no energy source to function, are commonly available electronic devices. At the appropriate time, data stored inside the RFID chip may be retrieved as explained below.

FIG. 3A shows an alternative configuration for a mechanical leak detector 42. The detector 42 includes a tubular body 170 having an axial passage 171. A piston 172 is slideably housed within passage 171 and moves between forward and rearward positions. A magneto 174 is secured to the piston 172 and moves therewith. An end plug 176 is located within a forward portion of passage 171 and includes a passageway 178. A sealing O-ring 180 is affixed about the plug 176 to seal off the passage 171. A coil spring 182 is situated within the passage 171 between a piston head 183 and end plate 52. A venting passageway 184 branches from passage 171 to a venting orifice 188 in the end plate 52. A valve ball 190 is positioned to seat against a lower segment 191 of the passageway 184 and is biased into a closed engagement by biasing spring 192.

Operation of mechanical leak detector 42 proceeds similarly as with assembly 154 of FIG. 5. Oil from a leaking hose will move up the casing assembly 40 from passage 142 until reaching passage 178. The oil forces the sliding piston rearward when the force of the oil exceeds the preset calibrated resistance of spring 192. Forcing piston 172 rearward moves the magneto 174 rearward and movement of the magneto may be read by a reader. Air is vented from passage 171 through passageway 184, forcing ball 191 into an open position. In the absence of oil leakage causing the piston 172 to move rearward, ball 190 seats against vent passageway 191 and closes off the internal passageway of the detector 171. Outside water cannot therefore invade the interior of the leak detection assembly because the pressure valve ball 190 seals off the vent passageway 184.

Figure 6:
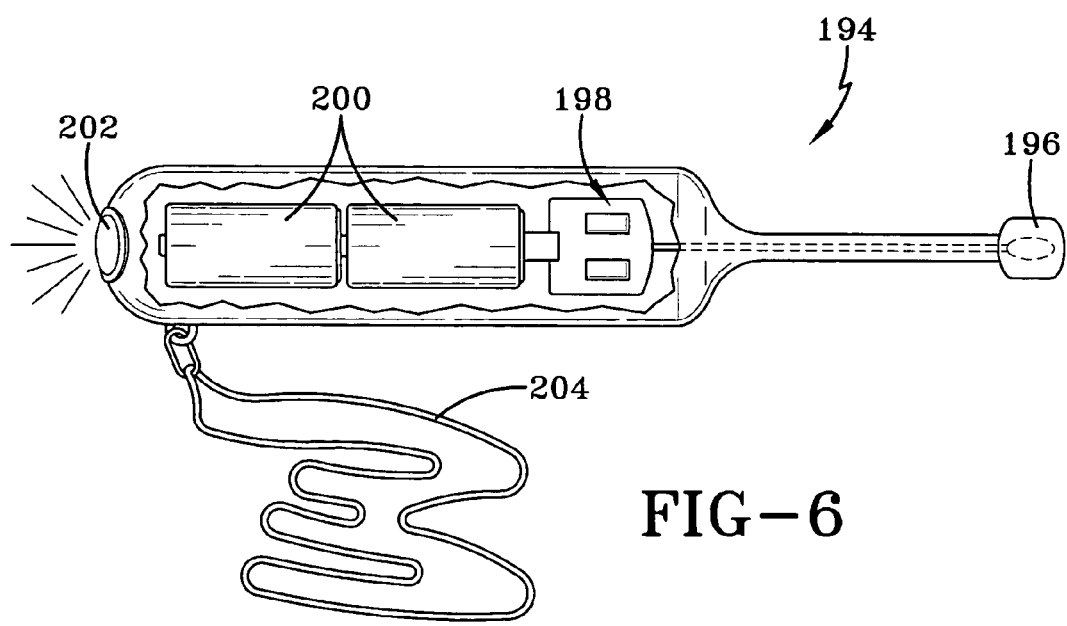
FIG. 6 is a plan view of a representative reader unit pursuant to the invention.

With reference to FIG. 6, a sensor reader and data storage device 194 is shown schematically. The reader includes a read head 196 that is electrically connected to circuit board electronics 198 powered by batteries 200. The detection of movement rearward of the magneto 174 will be detected by head 196 and the electronic circuitry will cause an activation of LED indicator light 202. In addition, data indicative of the detection of a leak, an identification of the particular leak detection assembly detecting the leak, may be stored in the device 194. Thus, the sensor reader and data storage device 194 provides a waterproof case, magnetic read head, electronic processor and data storage chip, long life battery and indicator LED. A wrist strap 204 may be provided for safely holding the unit.

During a hose line inspection, the inspector approximates the read head to the leak detector and the reader checks the RFID chip. The unit then reads and records the data stored in the RFID chip. The LED may be wired to flash to show the reading is completed. After the inspector finishes checking all sensors the data recorded in the reader may be downloaded into a computer system as part of the offshore hose line monitoring system. Such data may then be available through an internet or intranet website.

The telemetry leak detection assembly 46 may likewise be used in conjunction with the casing assembly 40 as will be appreciated from FIGS. 3A, 2A and 2B. Assembly 46 is constructed similar to assembly 44 in that optical fiber connectors 66, 68 protrude forward from optics circuit board 64. An O-ring seal 62 renders a storage compartment waterproof for a battery 60. Electronics board 56 controls the operation of micro-ultrasonic transmitter 57 and micro-radio transmitter 59. Sensing the presence of a leak with the telemetry assembly unit 46 is a described above with regard to the optical assembly 44. The presence of oil surrounding fiber 106 will cause optical properties of the fiber 106 to change. The change is detected and interpreted as evidencing a leak. The transmitters 57, 59 may then transmit data to a remote receiver identifying by means of a passive RFID chip within the assembly 46 the location of the leak, hose identification data, etc.

With reference to FIG. 4 and FIGS. 2A, 2B, 3A, a double carcass hose 204 is depicted consisting of an inner carcass 206, an outer carcass 208 extending to a carcass forward end 210, and a collection space 212 between the carcass layers 206,208. A connector 214 is affixed to each end of the hose 204 and includes a nipple or sleeve 216 that is positioned along the axial inner surface of the inner carcass 206. An elongate fluid collection housing 218 is positioned to extend along the outside of the connector sleeve 216 parallel with the axis of the hose 204. The housing 218 includes annular anchoring beads 220 that mechanically connect the housing 218 into the outer carcass layer 208 proximate forward end 210. The housing 218 is shown to include a top wall 222, a forward end wall 224, and a rearward end wall 226. Apertures (not shown) through the rearward end wall 226 allow fluid from the collection space 212 to migrate into the housing 218. As will be appreciated from a consideration of FIGS. 3A and 4, a sensor assembly 42, 44, 46 coupled to casing assembly 40 mounts preferably although not necessarily in the forward end wall 224 of the housing 218.

Figure 4:
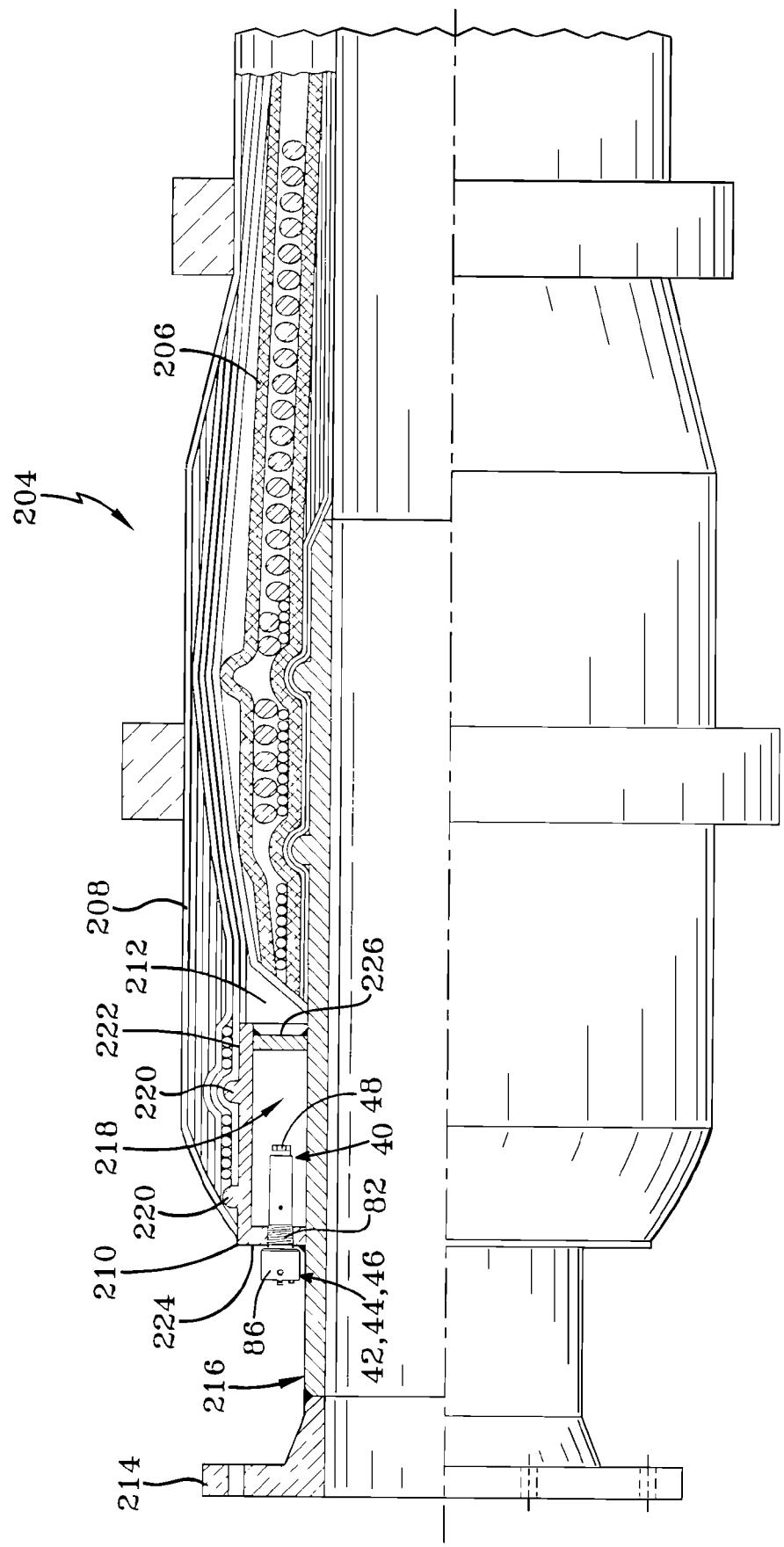
FIG. 4 is a longitudinal side elevation view shown in partial section of a house and nipple section having a leak detector attached thereto pursuant to the invention.

It will be noted that the sensor (42, 44, or 46) within casing assembly 40 is intended to protrude through the wall 224 of the housing 218. The sensor head portion 86 remains outside of the housing 218 as the sensor is affixed by means of screw threads 82 into a threaded aperture within wall 224. So positioned the transmission elements 57, 59 are outside of the mounting wall 224. The sensing element 42, 44, or 46 projects into the housing 224 and the optical fiber (or plural fibers) 106, within the casing assembly 40 resides within the housing 224. While one housing 224 and one sensor assembly 42, 44, 46/casing assembly 40 is shown in FIG. 4, a plurality of sensors may be positioned about the periphery of the hose, each coupling with a respective housing 224.

Functionally, fluid leakage from the inner carcass 206 or water entering the hose as a result of a breach in the outer carcass 208, will migrate into the collection space 212, eventually reaching and entering the forward end of the sensor 42, 44, 46/casing assembly 40. The pressure valve assembly 48 will open when the pressure of the fluid against the valve assembly exceeds a pressure threshold. When the pressure valve assembly 48 opens, fluid will enter into the axial passageway through the casing assembly 40 until reaching the optical fiber loop(s) 106. At this location, the escaping oil, or water, will contact the fiber 106. Contact between the fiber outer coating and the fluid will alter the transmission properties carried by the fiber 106 and be interpreted by the optical electronics circuitry mounted on board 64 as a leak. In the event that a telemetry version of the leak detection sensor 46 is employed, the electronics will then initiate a change in communication signal to indicate a breach by means of the ultrasonic transmitter 57 and/or the RF transmitter 59. In the event that the optical leak detector 44 is employed, a visual indicator change at signaling LED 58 will occur. In the event that the mechanical leak detector 42 is deployed, the mechanical detector will change position and indicate the existence of a leak to the sensor reader 194.

It will be noted that the optical sensing element 106 is passive, and does not have or need an active energy supply, making the element 106 intrinsically safer when contacting oil than other forms of sensing devices. The wall 224 through which the sensor 42, 44, or 46 mounts thus functionally isolates the passive sensing element 106 from the battery powered analysis element 56 and transmission elements 57, 59. Moreover, the system is relatively light and occupies minimal space. The replacement of a malfunctioning sensor is readily facilitated by removing the end plate of the sensing unit. Substitution of one sensor type (42, 44, 46) for a different sensor type is also readily facilitated in like manner should a malfunction occur or the needs of the user change. The optical fiber operates as a contacting medium for detecting the presence of fluid and is a reliable means for detecting the presence and identity of fluid in the space 212. The analysis element 56 is powered by durable long duration battery 60. The element 56 operates continuously without need for a timer and functions preferably using artificial intelligence or neural network software. The transmission elements 57, 59 include built-in replaceable batteries and ID chips. When data is collected and transmitted, the identity of the sensor/hose segment is provided with the data to a remote receiver. Corrective action to repair the leaking hose can then be taken. The transmission elements 57, 59 work under magnetic principle with no electrical contacts.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A fluid leak detection system for a hose line segment of the hose type comprising at least an inner carcass and an outer containment carcass separated from the inner carcass by a collection space, the detection system comprising:
   a fluid collection housing externally mountable to the hose line segment and having sidewalls defining an internal housing chamber configured to be placed in fluid communication with the collection space;
   a sensor casing mounted through at least one of the sidewalls of the fluid collection housing, the sensor casing having a first end within the internal housing chamber and a second end outside of the fluid collection housing;
   a sensor unit removably coupled to the sensor casing the sensor unit being configured to detect the presence of fluid within the internal housing chamber of the fluid collection housing and communicate the existence of fluid within the fluid collection housing; and
   a valve assembly coupled to the first end of the sensor casing, the valve assembly configured to selectively permit fluid in the collection space to enter the internal housing chamber when a pressure threshold for the fluid is exceeded within the collection space.

2. A fluid leak detection system according to claim 1 wherein the sensor casing has a passageway for the fluid extending between the first and second ends, and the sensor unit is configured to be inserted into the second end of the sensor casing.

3. A fluid leak detection system according to claim 1, wherein the sensor unit comprises:
   an elongate piston housing;
   a piston slideably contained within the piston housing and moving from a first position to a second position responsive to fluid force moving the piston within the piston housing;
   and
   a magneto device mounted to the piston and moving therewith between the first and second positions.

4. A fluid leak detection system according to claim 1, wherein the sensor unit is configured to communicate the existence of fluid within the fluid collection housing by positional detection of the sensor unit, visible light indicia, or telemetry communication.

5. A leak detection system according to claim 1, wherein the sensor unit is configured to detect the presence of fluid within the fluid collection housing by positional change in a sensor unit component responsive to fluid leaking movement, or transmission property change in an optical fiber responsive to fluid contact between the optical fiber and the fluid.

6. A leak detection system according to claim 1, wherein the sensor casing includes a forward nose portion and an enlarged head portion, and the sensor unit includes a unit casing configured to be removably received in the enlarged head portion of the sensor casing.

7. A leak detection system according to claim 1, wherein the sensor unit is one of a plurality of alternatively configured sensor units, each of the alternatively configured sensor units configured to be removably coupled to the sensor casing so as to be readily interchangeable with another of the sensor units.

8. A fluid leak detection system according to claim 1, wherein the sensor unit comprises an electronic device for collecting and storing data about the presence of fluid within the fluid collection housing.

9. A fluid leak detection system according to claim 8, wherein the electronic device comprises an RFJD tag for identifying the sensor unit.

10. A fluid leak detection system according to claim 9, further comprising:
a mobile reader unit for collecting and storing data from the RFID tag.

11. A fluid leak detection system according to claim 1, wherein the sensor unit comprises at least one optical sensing element positioned within the sensor casing and within the internal housing chamber for optically detecting the presence of fluid in the internal housing chamber.

12. A fluid leak detection system according to claim 11, wherein the sensor unit comprises at least one externally visible light source for communicating the existence of fluid within the fluid collection housing.

13. A fluid leak detection system according to claim 11, wherein the sensor unit comprises at least one transmitter unit for transmitting leak detection data to at least one remote receiver.

14. A fluid leak detection system according to claim 13, wherein the at least one transmitter unit comprises a pulse micro-ultrasonic transmitter.

15. A fluid leak detection system according to claim 13, wherein the at least one transmitter unit comprises a pulse micro-radio transmitter.

16. A fluid leak detection system according to claim 13, wherein the at least one transmitter unit comprises a micro-ultrasonic transmitter and a micro-radio transmitter.

17. A fluid leak detection system comprising:
a hose line segment of the hose type comprising at least an inner carcass and an outer containment carcass separated from the inner carcass by a collection space;
a fluid collection housing externally mountable to the hose line segment and having sidewalls defining an internal housing chamber in fluid communication with the collection space;
a sensor casing mounted through a least one of the sidewalls of the fluid collection housing, the sensor casing having a first end within the internal housing chamber and a second end outside of the fluid collection housing;
a sensor unit removably coupled to the sensor casing, the sensor unit being configured to detect the presence of fluid within the internal housing chamber of the fluid collection housing and communicate the existence of fluid within the fluid collection housing; and
a valve assembly coupled to the first end of the sensor casing, the valve assembly configured to selectively permit fluid in the collection space to enter the internal housing chamber when a pressure threshold for the fluid is exceeded within the collection space.

18. A fluid leak detection system according to claim 17 wherein the sensor casing has a passageway for the fluid extending between the first and second ends, and the sensor unit is received in the second end of the sensor casing.

19. A leak detection system according to claim 17, wherein the sensor casing includes a forward nose portion and an enlarged head portion, and the sensor unit includes a unit casing configured to be removably received in the enlarged head portion of the sensor casing.

20. A leak detection system according to claim 17, wherein the sensor unit is one of a plurality of alternatively configured sensor units, each of the alternatively configured sensor 21. A fluid leak detection system according to claim 17, wherein the sensor unit is configured to communicate the existence of fluid within the fluid collection housing by positional detection of the sensor unit, visible light indicia, or telemetry communication.

22. A leak detection system according to claim 17, wherein the sensor unit is configured to detect the presence of fluid within the fluid collection housing by positional change in a sensor unit component responsive to fluid leaking movement, or transmission property change in an optical fiber responsive to fluid contact between the optical fiber and the fluid 23. A method for detecting fluid leaks in a double carcass hose of the hose type having at least an inner carcass and an outer containment carcass separated from the inner carcass by a collection space, comprising:
a. affixing a fluid collection housing to the hose, the housing having sidewalls defining an internal housing chamber in fluid communication with the collection space;
b. mounting a sensor casing through at least one sidewall of the fluid collection housing;
c. selecting a sensor unit configured to couple to the sensor casing and configured to detect the presence of fluid within the internal housing chamber and communicate the existence of fluid within the internal housing chamber;
d. removably coupling the sensor unit to the sensor casing and
e. selectively admitting fluid through a valve assembly from the collection space into the internal housing chamber for detection by the sensor unit when a pressure threshold for the fluid is exceeded in the collection space.

24. The method according to claim 23 further comprising:
collecting data from the sensor unit;
storing the data in a mobile reader memory;
downloading the stored data from the mobile reader memory into a computer memory;
and
providing website access to the data stored in the computer memory.

25. The method according to claim 23, wherein the sensor unit is one of a plurality of alternatively configured sensor units, each of the alternatively configured sensor units configured to be removably coupled to the sensor casing so as to be readily interchangeable with another of the sensor units.

* * * * *